United States Patent [19]
Green et al.

[11] Patent Number: 6,060,164
[45] Date of Patent: May 9, 2000

[54] FLOCCULATING OR VISCOSIFYING COMPOSITIONS AND THEIR PRODUCTION AND USE

[75] Inventors: Michael Green; Malcolm Hawe; John Rodney Field, all of West Yorkshire, United Kingdom

[73] Assignee: Ciba Specialty Chemicals Water Treatments Limited, Bradford, United Kingdom

[21] Appl. No.: 08/817,498

[22] PCT Filed: Mar. 14, 1997

[86] PCT No.: PCT/GB97/00723

§ 371 Date: May 29, 1997

§ 102(e) Date: May 29, 1997

[87] PCT Pub. No.: WO97/34945

PCT Pub. Date: Sep. 25, 1997

[30] Foreign Application Priority Data

Mar. 15, 1996 [GB] United Kingdom .................. 9605420

[51] Int. Cl.[7] ........................................ B32B 5/16
[52] U.S. Cl. ...................... 428/402; 428/407; 210/728; 252/174.23; 526/335; 526/910; 526/911; 526/916
[58] Field of Search ..................... 428/402, 403, 428/407; 526/76, 335, 910, 911, 916; 210/723, 728; 252/174.13, 174.23

[56] References Cited

U.S. PATENT DOCUMENTS

| | | | |
|---|---|---|---|
| 3,284,393 | 11/1966 | Vanderhoff et al. | 260/29.6 |
| 4,035,317 | 7/1977 | Gershberg | 260/2.5 |
| 4,585,812 | 4/1986 | Field | 523/221 |
| 4,720,346 | 1/1988 | Flesher et al. | 210/734 |
| 4,816,558 | 3/1989 | Rauch et al. | 528/501 |
| 4,847,309 | 7/1989 | Klesse et al. | 523/139 |
| 4,943,378 | 7/1990 | Flesher et al. | 210/734 |
| 5,362,517 | 11/1994 | Flesher et al. | 427/222 |
| 5,460,817 | 10/1995 | Langley et al. | 424/408 |
| 5,492,646 | 2/1996 | Langley et al. | 252/174 |

FOREIGN PATENT DOCUMENTS

| | | | |
|---|---|---|---|
| 0 202 780 B1 | 4/1986 | European Pat. Off. | C02F 1/56 |
| 0 326 382 A2 | 1/1989 | European Pat. Off. | C08J 3/12 |

*Primary Examiner*—Hoa T. Le
*Attorney, Agent, or Firm*—David R. Crichton

[57] ABSTRACT

Primary polymer particles having a size at least 90% below 10 $\mu$m and which contain water soluble and water insoluble polymer are made by reverse phase polymerisation of a water soluble ethylenically unsaturated monomer or monomer blend with cross linking agent, and the emulsion is then spray dried to form spray dried granules which disintegrate upon addition to water, thereby forming an aqueous composition of the insoluble particles having activity similar to the starting emulsion. This aqueous composition of insoluble particles is particularly useful for flocculation, for instance flocculation of sewage sludge followed by centrifugation or belt pressing, or for viscosification.

15 Claims, 1 Drawing Sheet

FLOCCULATING OR VISCOSIFYING COMPOSITIONS AND THEIR PRODUCTION AND USE

This invention relates to polymers which can be used as flocculants or viscosifiers and, in particular, to ways of providing such polymers in powder form while retaining known advantages of polymers which commercially have previously been provided in liquid form.

BACKGROUND OF THE INVENTION

Polymers which are to serve as flocculants or viscosifiers tend to provide a high aqueous solution viscosity with the result that it is not practicable to supply such polymers to the user in the form of aqueous compositions. Usually the polymers are supplied as powders or reverse phase emulsions.

The powders are usually made by gel polymerisation followed by comminution and drying or by reverse phase bead polymerisation followed by drying, filtration and, if desired, comminution. The reverse phase emulsions are made by reverse phase emulsion polymerisation to form an emulsion of small (below 10 μm) aqueous polymer droplets in a non-aqueous liquid. Frequently, the user is supplied with this emulsion of aqueous polymer particles. It is, also, known to subject the emulsion to distillation so as to form an emulsion of substantially non-aqueous polymer particles in the non-aqueous liquid, and then supply the user with this. However it is also known to recover powder from the emulsion.

A typical process for this recovery is described in U.S. Pat. No. 3,284,393 and involves diluting the emulsion of aqueous polymer particles with non-aqueous liquid and then flocculating the particles with acetone, filtering them from the emulsion and drying under vacuum.

However this has not proved to be commercially successful. One of the reasons for this is probably that it is difficult to control the agglomeration or precipitation of the emulsion so as to form aggregates of controlled size in an economic manner.

Another way which has been proposed in the literature for recovering water soluble dry, polymer from a reverse phase polymer emulsion is by spray drying. An example of such a disclosure is in U.S. Pat. No. 4,035,317. However spray drying processes also have not proved to be of any significant technical value in the recovery of powder from reverse phase emulsions and, so far as we are aware, there is no commercial production of spray dried granules of water soluble polymer made by reverse phase emulsion polymerisation.

Instead, the present state of the technology is that viscosifier or flocculant polymers which are required in powder form are made by gel or bead polymerisation and they are only made by reverse phase emulsion polymerisation if they are going to be supplied in the form of reverse phase emulsions.

One disadvantage of putting the polymers into powder form by any of these techniques is that it is necessary to put them into the form of a homogeneous aqueous composition before use as viscosifier or flocculant. Thus the water soluble powder is dissolved in water to make a homogeneous solution. It is well known that the contact between particles of water soluble high molecular weight polymer in the presence of water is liable to lead to the formation of gelatinous agglomerates which can take a long time to dissolve. Accordingly special techniques and apparatus have been developed for minimising the accidental formation of these agglomerates during the dissolution of the soluble polymer. As a result, provided that reasonable care is taken, the soluble polymer can be put into true homogeneous solution irrespective of whether it is provided as particles of regular or irregular size and irrespective of whether the particles have been made by gel polymerisation, bead polymerisation or some other technique.

When a water soluble, reverse phase emulsion, polymer is being used in liquid form, the normal process for "activating" the emulsion comprises mixing the reverse phase emulsion with water in the presence of an oil-in-water emulsifier. Again, suitable procedures for achieving a homogeneous solution by such activation procedures are well known and can result in rapid activation of the individual polymer particles, substantially without any permanent or semi-permanent agglomeration of the particles.

Particular problems, however, arise when the polymer has been made in the presence of polyethylenically unsaturated cross linking agent. If the amount of this is very high, then the product is wholly insoluble. However if the amount of cross linking agent is low or medium then the polymer will contain both soluble and insoluble fractions. As an example, it has been known for many years to supply print paste thickeners which are reverse phase emulsions of acrylic polymer cross linked by, for instance, 500 parts methylene bis acrylamide (MBA) or other polyethylenically unsaturated cross linker. Thus the material which is supplied to the user consists of a continuous, non-aqueous, phase in which are dispersed the primary particles, which are particles below 10 μm and each of which is a cross linked acrylic polymer. Thus each primary particle consists of an insoluble cross linked network having the defined particle size throughout which soluble polymer may be distributed. Upon activating this emulsion in water, the soluble polymer migrates out of the particles leaving the insoluble network particles as a suspension in an aqueous solution of the soluble component of the particles.

It is intended that the insoluble components should not agglomerate but should, instead, remain as individual primary particles having a size no bigger than the initial primary particle size, i.e., substantially all below 10 μm and often substantially all below 3 μm. It is necessary that the primary particles do not agglomerate either within the emulsion or during activation since, if they do, they are liable to form gelatinous lumps which will not pass through the printing screen but will instead block it. Occasionally we do see some tendency for the formation of permanent or semi-permanent agglomerates to occur within the emulsion or during activation when the primary particles in the emulsion are below 10 μm in size. Examination of a deposit shows that it consists of a permanent or semi-permanent agglomerate of the primary particles, this agglomerate presumably being formed as a result of the wet primary particles sticking to one another.

Agglomeration in this manner of primary particles which are wet and which contain both soluble and insoluble components is not unexpected in view of the known tendency for soluble polymers to agglomerate. However whereas soluble polymers, once agglomerated, will eventually redissolve, agglomerates formed from soluble and insoluble components will be much more difficult to redissolve and may never redissolve, because of the adhesion between the insoluble particles and the soluble components that are distributed within them in the initial emulsion. It is for this reason that care has to be taken in developing the activation procedures for print paste thickeners so as to minimise the risk of unwanted agglomeration of the primary particles.

There are various other processes where it is known to be desirable to supply the user with primary particles having a size below 10 μm and which have both soluble and insoluble components and wherein the polymer is available during use in the form of particles having a size substantially all below 10 μm. The polymers are made by reverse phase polymerisation of a water soluble ethylenically unsaturated monomer or monomer blend and a low to medium amount of polyethylenically unsaturated cross linking agent to form a reverse phase emulsion of primary particles which contain an insoluble polymer network and a soluble polymer and they are used for various viscosifying and flocculation purposes. Preferred flocculation processes are described in EP 202,780.

In practice such polymers are always supplied to the user in the form of a reverse phase emulsion. This is because the theoretical possibility of providing them in powder form has proved difficult to achieve in a commercially economic and satisfactory manner. For instance we describe in EP 326,382 a process in which a cationic, moderately cross linked, reverse phase emulsion polymer in accordance with EP 202,780 is first dried by distillation to give an emulsion (or dispersion) of dry polymer particles in non-aqueous liquid. These dry polymer particles are then precipitated from the dispersion by adding acetone. They are then dried while entrained in air and are sprayed with water containing fumed silica so as to coat the particles and aggregate them, and they are then further dried in a fluidised bed. Thus this technique first involves drying the particles, then coating and rewetting and aggregating the particles, and then redrying them. Although it is operable it tends to be inconvenient and it is difficult to achieve controlled particle size by this technique. It is noted in EP 326,382 that if the powder, without the silica aggregation step, is added direct to water then serious gel blocking occurs. This again is consistent with the expectation that undesirable permanent aggomeration will occur when the primary particles of soluble and insoluble polymer contact one another while wet.

Many users would prefer to receive a solid polymeric composition consisting substantially only of the relevant polymer, rather than to receive a reverse phase emulsion. This need can be met, with soluble polymers, by supplying a conventional gel or bead product but cannot be met in respect of those compositions where the primary particles have to be below 10 μm and are cross linked and so contain soluble and insoluble components. In particular, it would be desirable to be able to provide powdered products which can be made in an easy and economic manner and which will revert substantially completely to particles upon addition to water such that the performance of the original emulsion polymer is retained. Thus the permanent agglomeration of the wet primary particles has to be avoided.

SUMMARY OF THE INVENTION

We have now surprisingly found that it is possible to make such granules by spray drying. It is very surprising that it is easily possible to conduct the spray drying, without incorporating any special additives, in such a way that the primary particles do not agglomerate together in a permanent or semi-permanent manner but instead will easily separate from one another upon addition of the granules to water. It is also surprising that the polymer does not seem to undergo any significant extra cross linking during the process.

DETAILED DESCRIPTION OF THE INVENTION

In one aspect, the invention is directed to a process of making granules which have a size of at least 90% by weight above 20 μm and which are formed of primary particles having a size at least 90% by weight below 10 μm and which contain water soluble polymer and water insoluble polymer. The process comprises making an emulsion of the primary particles in a non-aqueous liquid by reverse phase polymerisation of an aqueous solution of water soluble ethylenically unsaturated monomer or monomer blend which includes 5 to 2000 ppm polyethylenic cross linking agent, and spray drying the emulsion and thereby making spray dried granules which are formed of the primary particles and which disintegrate substantially completely upon addition to water.

BRIEF DESCRIPTION OF THE DRAWING

The drawing shows the dose performance relationship for the linear emulsion polymer (A), for the cross linked emulsion polymer (B) and for the spray dried granules (C).

Another aspect of the invention relates to spray dried granules which have a size at least 90% by weight above 20 μm and which are formed of primary particles. The primary particles have a size of at least 90% by weight below 10 μm and are formed of a polymer of water soluble ethylenically unsaturated monomer or monomer blend and 5 to 2000 ppm polyethylenically unsaturated cross linking agent and contain water soluble and water insoluble polymer. The granules have been formed by spray drying an emulsion of the primary particles in a non-aqueous liquid and disintegrate substantially completely upon addition to water.

Figure 1:
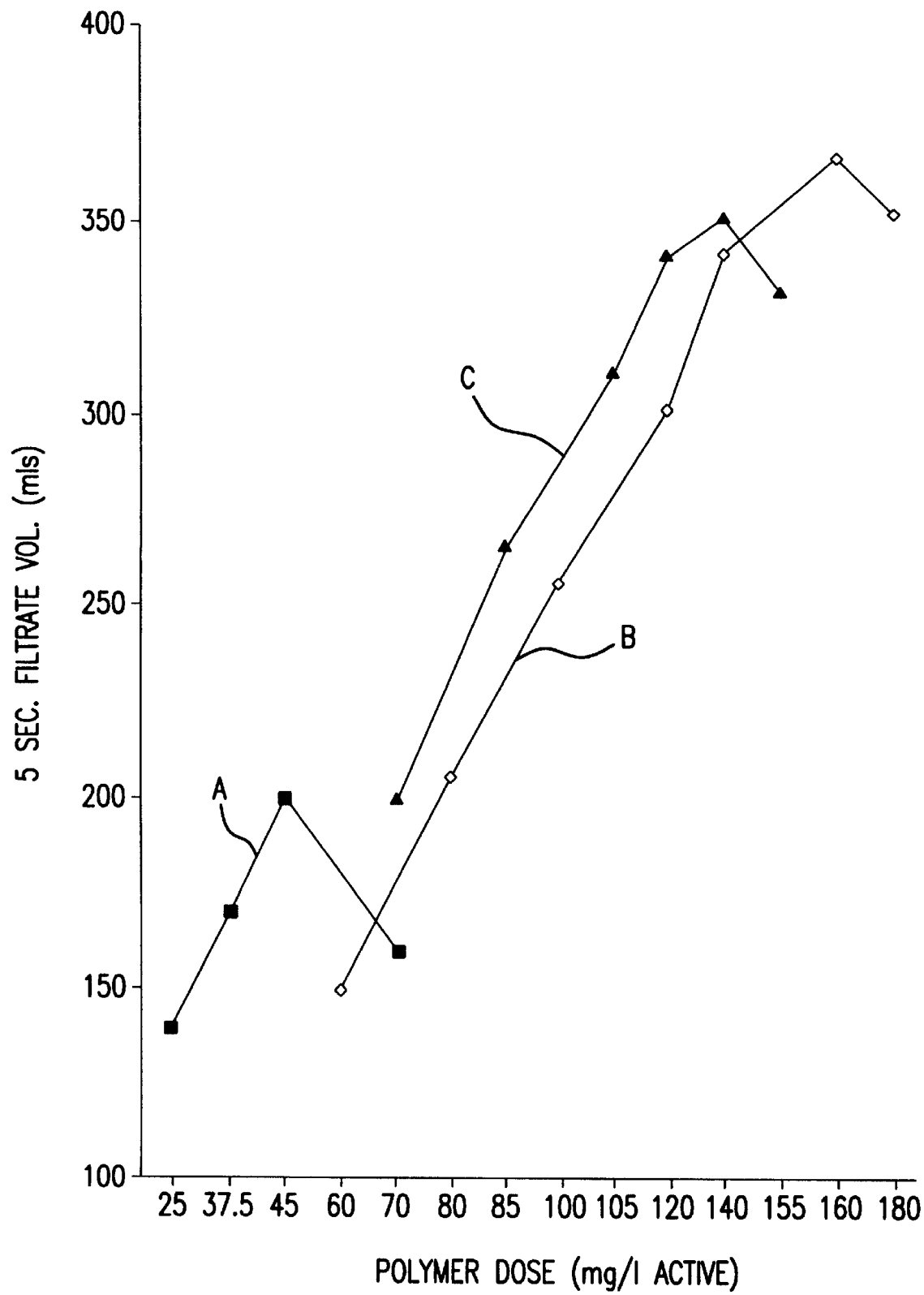

By saying that the granules disintegrate substantially completely we mean that, upon addition to water, the granules disintegrate to give an aqueous composition which is functionally similar to the solution made from the starting emulsion. In practice the granules should usually disintegrate into particles having similar size ranges to the primary particles that exist in water when the starting emulsion is added to water. For instance the intrinsic viscosity (IV) value (discussed below) is usually at least about 70% or 80% and preferably at least about 90% or 95% of the intrinsic viscosity value of the emulsion polymer. The ionic regain (IR) value for cationic polymers (as discussed below) after disintegrating the granules into water is usually at least about 70% or 80% and preferably at least 90 or 95% of the ionic regain value of the starting emulsion polymer. The polymer is usually a flocculant or viscosifier and the flocculation or viscosifying performance obtained at optimum dosage when the granules are disintegrated into water is generally at least about 70% or 80% and preferably at least about 90 or 95% of the performance at optimum dosage of the starting emulsion. For instance if the starting emulsion gives a free drainage value (for a flocculant) of X units, the disintegrated granules preferably give a flocculation performance of at least 0.8 X and preferably at least 0.9 X or 0.95 X. The values of IR and/or IV and/or X may increase slightly, e.g., to up to about 120% or 130% of the original value.

The particles into which the granules disintegrate when added to water preferably have the same size range as defined for the starting emulsion, namely at least 90% by weight below 10 μm and preferably at least 90% below 3 μm. The reason for this is that the performance of the cross-linked polymers depends in part on the particle size and so it is necessary, for good performance that the disintegrated granules should produce a particle size within the range that it useful for good results.

Preferably the particles to which the granules disintegrate consist substantially entirely of the insoluble fractions of the original primary particles, but some residual agglomeration can be tolerated provided the final size is still below 10 μm and preferably below 3 μm. Thus preferably the particle size distribution of the particles obtained by disintegration of the granules indicates an average size of not more than 3 times and generally not more than 1.5 or 2 times (often 1 to 1.3 times) the average of the particle size distribution of the starting emulsion. In general, satisfactory results are obtained if the particle size generated by disintegration of the granules is at least 90% below 10 μm and preferably 90% below 3 μm. Naturally the soluble fraction of the primary particles will tend to go into the solution in the water, with the result that the "solution" which is obtained is an aqueous dispersion of the insoluble particulate fraction in a true solution of the soluble fraction.

Another aspect of the invention relates to a process of making a flocculant or viscosifying solution comprising mixing into water the defined spray dried granules or the granules made by the defined spray drying process.

Another aspect of the invention relates to a process of flocculating a suspension of suspended solids by forming a flocculant solution by mixing the granules with water, and adding the flocculant solution to the suspension and thereby flocculating the suspended solids.

Another aspect of the invention relates to a process for making a flocculant solution or a viscosified solution comprising mixing into water granules which have a size at least 90% by weight above 20 μm and which have been formed by reverse phase emulsion polymerisation of water-soluble ethylenically unsaturated monomer or monomer blend which includes 5 to 2,000 ppm polyethylenically unsaturated cross linking agent and thereby forming polymer particles having a size at least 90% by weight below 10 μm and which contain water-soluble polymer and water-insoluble polymer, and making the granules by spray drying the emulsion. Preferably the granules, in this aspect of the invention, disintegrate substantially completely into particles (preferably the primary particles) upon addition to water. In particular, the granules of the invention preferably provide, when mixed with water, flocculation or viscosifying effect substantially the same as the starting emulsion, i.e., at least 80% of it and preferably at least 90 or 95% of the flocculation or viscosifying performance of the starting emulsion.

The flocculated suspension may be continuously kept in suspension by agitation, for instance when the flocculated suspension is used as a catalyst bed or is being pumped along a flow line, but preferably the flocculated suspension is subjected to solid-liquid separation. Separation may be by sedimentation but preferably it is by centrifugation or filtration. Preferred processes of solid-liquid separation are centrifugal thickening or dewatering, belt pressing, belt thickening and filter pressing.

The starting emulsion of primary particles in non-aqueous liquid is made by reverse phase polymerisation of water soluble monomer or monomer blend in the presence of polyethylenic cross linking agent in an amount such that the resultant primary particles contain water soluble and water insoluble polymer. Thus the amount of cross linker should be such that the particles have an cross linked network of insoluble polymer, but also have soluble polymer which is within the network and goes into true solution when the particles are mixed with water.

The monomers from which the polymers are made may be any conventional ethylenically unsaturated monomers. They may be non-ionic, anionic or cationic or blends of for example 0 to 99% non-ionic monomer with 100 to 1% by weight anionic or cationic monomer.

The preferred water-soluble non-ionic monomer is acrylamide but others such as vinyl pyrrolidone, N-vinyl formamide, methacrylamide and hydroxyethyl methacrylate or acrylate can be used.

The preferred water-soluble anionic monomers are ethylenically unsaturated carboxylic or sulphonic acids (including water-soluble salts thereof) such as acrylic acid, methacrylic acid, vinyl sulphonate or amps (U.S. trade mark).

The preferred cationic ethylenically unsaturated monomers are dialkylaminoalkyl(meth)-acrylamides and acrylates (including their acid addition and quaternary salts) such as dimethylaminoethyl(meth)acrylate, dimethylaminopropyl methacrylamide and dimethylaminomethyl acrylamide (Mannich base). Other cationic monomers that can be used include diallyldimethylammonium chloride.

The reverse phase polymerisation is conducted in conventional manner so as to form a polymer which has a molecular weight such that it is suitable for use as a flocculant or viscosifier. If the polymer was made in the absence of cross linking agent, it is then generally necessary for it to have intrinsic viscosity above 4 dl/g. Throughout this specification, intrinsic viscosity is measured by suspended level viscometer at 20° C. on solutions of known total weight of polymer in 1N sodium chloride buffered to pH 7. Because the IV is calculated on total weight, and because insoluble polymer contributes less, in this technique, to apparent viscosity than soluble polymer, the IV will tend to decrease as the amount of insoluble fraction increases, even though the polymerisation conditions may be unchanged (except for the amount of cross linking agent). Preferred polymers of the invention are those that would have had IV above 6 or above 8 dl/g in the absence of cross linker.

In practice the IV of the actual polymers (i.e., made in the presence of the cross linking agent) is also usually quite high, generally above 2 dl/g and preferably above 4 dl/g. Often it is at least 6 dl/g and may be higher, eg up to 14 dl/g or more.

The invention is, however, also applicable to polymers having IV below 2 dl/g, for instance down to 0.8 dl/g or even less, provided the polymer can be present in solid form at ambient temperatures and has an insoluble fraction and is capable of being spray dried and used as a flocculant or viscosifier. For instance the invention is applicable to the spray drying of polymers of diallyl dimethyl ammonium chloride homopolymer or copolymer, e.g., with up to 20% acrylamide or more. When the polymer is a flocculant, it may be a high charge density coagulant, but is preferably a bridging flocculant of high IV (generally above 4 dl/g).

The amount of cross linking agent which is incorporated is always at least 5 ppm (by weight based on dry weight of polymer or total monomer) polyethylenically unsaturated cross linking agent and will be whatever amount is required to give the desired proportions of soluble and insoluble polymer in the product. When the molecular weight would be very high in the absence of cross linker it will be satisfactory to use the lower amounts of cross linker (for instance near 5 ppm or higher) whilst if the molecular weight in the absence of cross linker would be lower then higher amounts of cross linker may be required (e.g., up to 2000 ppm).

The amount of cross linker is also influenced by the intended properties of the product. When it is intended that the performance of the product should be dominated by the particulate insoluble fraction, for instance in a print paste thickener, then it is desirable to use higher amounts of cross linking agent than when performance depends significantly on the soluble polymer as well as the insoluble polymer. For instance, when the polymer is to be used as a print paste thickener or other viscosifier it is often desirable for the amount of cross linker to be in the range 300 to 2000 ppm since this will tend to produce polymers having a higher proportion of insoluble polymer and a lower proportion of soluble polymer, than when lower amounts of cross linking agent are used. When the polymer is to be used for flocculation, then the amount of cross linker is generally in the range 5 to 200 ppm, preferably 5 to 100 ppm, since this produces polymer having a significant soluble fraction and only a lesser amount of insoluble fraction.

There are various ways of determining the presence or absence of insoluble polymer particles. These can include visual methods. For instance one way of determining the presence of insoluble polymer particles is by forming an aqueous solution of the granules, diluting it to a very low concentration, and then examining a dried droplet of the very dilute solution using a scanning electron microscope or a scanning transmission electron microscope. It is necessary to distinguish between extraneous matter and the polymer particles. In order to minimise the presence of extraneous matter, it is desirable to use highly purified water. The polymer particles will generally tend to collect as a ring around the edge of the droplet which has been applied to the SEM stub when examined after drying.

Another, indirect, way of determining the presence of insoluble particles is by titration of ionic groups in the polymer since with most insoluble polymers the ionic groups trapped in the insoluble polymeric matrix will be less available to titrant than the ionic groups in a soluble polymer. In particular, the presence of insoluble polymer particles can be indicated indirectly by a high ionic regain value when the polymer is a cationic polymer made with relatively low amounts of cross linking agent. For instance, ionic regain is a suitable indication of the presence of insoluble particles when the polymer is made from 5 to 200 ppm, often 5 to 100 ppm, cross linker with a cationic monomer or monomer blend typically including acrylamide and dialkylaminoalkyl(meth)-acrylate or -acrylamide, generally as acid addition or quaternary salt. Ionic regain is defined in EP 202,780 and values of at least 20%, and preferably at least 25 or 30%, generally up to around 60 or 70%, are usually indicative of insoluble particles.

The polymerisation is conducted under known conditions, for instance choice of initiator, emulsifier and non-aqueous liquid, so as to form a stable reverse phase emulsion of the desired polymer having primary particles at least 90% by weight below 10 $\mu$m. Preferably at least 90% by weight of the primary particles in the emulsion are below 3 $\mu$m. All particle sizes herein are the dry size, that is to say the size which is observed when the product is dehydrated, for instance when a droplet of the emulsion is put on to a scanning electron microscope stub and examined after drying under vacuum. At least 90% by weight of the particles are generally within the range 0.1 to 3 $\mu$m. The particles are preferably within the range 0.1 or 0.5 to 2 $\mu$m and often 0.2 to 1 $\mu$m, at least 60% and frequently at least 90% by weight of the particles being within this size range. The weight average particle size may be around 0.1 to 0.5 $\mu$m but is usually a little higher, for instance up to 1 or 1.5 $\mu$m. Although it is normally preferred that at least 90% by weight of the particles should be above 0.1 $\mu$m, the invention is also applicable to the products generally known as microemulsions where 90% by weight of the particles are typically in the size range 0.01 to 0.5 or 1 $\mu$m. The desired particle size, in any particular process, is controlled by appropriate selection of the emulsifier, emulsifier amount, and homogenisation conditions, all in known manner. The size of the particles into which the granules disintegrate preferably fall within these ranges.

Any of the conventional water-in-oil emulsifiers and hydrocarbon or other non-aqueous liquids which are conventional for reverse phase polymerisation may be used. If desired, hydrophilic polymer or, preferably, amphipathic polymer is included in the emulsion, all as is conventional in reverse phase emulsion polymerisation processes, for instance as described in EP-A-202,780 the entire disclosure of which is herein incorporated by reference.

In order to facilitate the disintegration of the granules into the primary or other very small particles it is necessary that the primary particles should not stick together too strongly within the granules. Additives which are liquid or soft during spray drying or, especially, at ambient temperatures may tend to promote adjacent primary particles sticking to one another. It is therefore desirable to include additives in the emulsion which are solid at the temperature of spray drying or, at least, are solid at ambient conditions. For instance the inclusion of a surfactant which is solid under these conditions as part or all of the surfactant in the emulsion is advantageous. Other solid materials that may be incorporated for this purpose include polymeric stabilisers which are solid at 25° C. rather than waxy or liquid.

Any of the known polyethylenically unsaturated cross linking agents which are suitable for making cross linked water soluble or water swellable polymers by reverse phase polymerisation may be used, for instance as described in EP 202,780. Methylene bis acrylamide is an example but other difunctional, trifunctional and higher functional ethylenically unsaturated monomers may be used, as in EP 202,780.

The amount of surfactant and/or polymeric stabiliser is usually in the range 1 to 10% based on polymer.

The amount of water immiscible liquid in the emulsion which is to be spray dried is generally from 30 to 70%, often around 40 to 60%, based on the dry weight of polymer in the emulsion.

The emulsion, as made initially, is a composition comprising aqueous polymer particles in which the amount of water is generally in the range 20 to 70%, often around 30 or 40 to 60% based on the dry weight of polymer. Thus the starting emulsion typically contains 25 to 40% of each of the water immiscible liquid, the water and the polymer, and 1 to 10% emulsifier and/or polymeric stabiliser.

It is possible to subject the emulsion to dehydration by distillation, generally referred to as azeotropic distillation, prior to spray drying. This would then convert the polymer particles into substantially dry form before spray drying. However it is unnecessary and undesirable to conduct this intermediate drying stage and preferably the emulsion which is subjected to spray drying is an emulsion in which the polymer particles contain water, for instance in the amounts specified above.

It is particularly surprising that spray drying of the wet emulsion gives good results, in view of what is known about permanent or semi-permanent agglomeration of wet, partly soluble, polymer particles and in view of the fact that the emulsion in EP 326,382 was dried before the particles were precipitated and it was warned that gel blocking occurs when the precipitated particles are added to water.

In the invention, however, the particles which are subjected to spray drying are preferably the wet polymer particles. Despite bringing these wet polymer particles together into granules during the spray drying process, and despite the previous experience with print paste thickeners and the warnings in EP 326,382, we find it is easily possible to achieve appropriate disintegration of the granules.

It seems that the inclusion of water in the particles of the emulsion which is to be spray dried promotes the permeability of the granules to allow the water to permeate into the core rather than to dissolve the granules solely from its outside surface inwards. Thus there may be pores, for instance micropores, extending inwardly from the outer surface of the granule towards the core. If desired, other materials can be included in the emulsion in order to promote the permeability, but it is generally found unnecessary to add to the emulsion materials that would not otherwise be present in a conventional reverse phase emulsion, for instance in addition to the conventional water-in-oil emulsifier and optional hydrophilic or amphipathic polymeric stabiliser. There may be some voids in the granules, especially when the granules are of larger particle size, and it seems that the presence of these voids, and the macropores leading to them, may be useful in promoting outward expansion and bursting of the granules, thus promoting the distribution of primary particles into water.

If the granules are relatively small, for instance mainly below 100 $\mu$m, then they may be substantially free of voids and can be disintegrated down to the primary particles easily upon mixing with water. However when the granules are larger the presence of voids can be desirable to promote dissolution.

The spray dried granules can be relatively large but generally at least 90% by weight are below 500 $\mu$m, usually below 250 $\mu$m. At least 90% by weight may be below 100 $\mu$m. Often at least 20%, and usually at least 50%, by weight are above 40 $\mu$m and often above 100 $\mu$m. The amount below 20 $\mu$m is preferably below 20% by weight, preferably below 5% by weight. Thus, the product is preferably substantially free of very fine material even after agitation such as occurs during storage and transport. The preferred granules have a size at least 90% in the range 50 to 250 $\mu$m.

The granules of the desired size can be made by subjecting the described emulsion to conventional spray drying conditions using a conventional spray drier, with the particle size being controlled in known manner by appropriate selection of spray drying orifices, rate of pumping through the orifices, and rate of drying (temperature and drier dimensions) of the spray dried material.

The granules are usually used in the form in which they are manufactured. If desired they may be formed into water-disintegratable aggregates. Thus the granules formed in the spray drier may be aggregated into substantially non-friable but water-disintegratable aggregates. For example this may be conducted by blending the granules with a small amount of a bonding agent which is water-dispersible or water-soluble and the resultant mixture of granules and bonding agent is then converted into aggregates of the desired size by known techniques.

The bonding conditions must not result in such strong bonding between the granules that the aggregates do not readily disintegrate in water. Since the surface of the granules will consist of or include water-soluble polymer, the amount of water present during the aggregation stage must always be very low, for instance below 20% and preferably below 7% but is generally below 10%, all based on the dry weight of the granules. The bonding agent may consist solely of water or it may consist of some other material dispersed or dissolved in water or dispersed or dissolved in another liquid (so as to avoid contact in the granules with water). Suitable bonding agents are water-soluble waxes such as high molecular weight polyethylene glycol or other materials such as other polyglycols, ethoxylated alkyl alcohols, low molecular weight water soluble polymers of the same ionicity as the granules, and water soluble solid surfactants which are compatible with the polymer.

The granules moistened with the water or other liquid can be shaped into aggregates of any convenient size by any convenient technique. For instance the moistened mixture may be extruded and the extruded material may be pelletized.

The aggregates which are formed typically have a size at least 90% in the range 200 $\mu$m to 5 mm, most preferably in the range 500 $\mu$m to 2 mm.

The granules, or aggregates of them, may be disintegrated by mixing with water in conventional manner. This may be achieved in some instances with little or no turbulence but generally it is desirable to apply considerable turbulence and preferably the disintegration of the granules conducted using a technique similar to the dissolution techniques conventionally used for dissolving comminuted gel particles in water. Generally the distribution is conducted by mixing the granules or aggregates vigorously into water under conditions that minimises the risk of the granules or aggregates sticking to one another, followed by ageing the resultant aqueous composition, with agitation when necessary, for a prolonged period typically ten minutes to five hours, when its preferably around half an hour to two hours. Mixing apparatus of the type commercialised under the trade name Jet Wet is conveniently used.

The amount of water into which the granules or aggregates of granules are mixed is generally such that the resultant solution has a polymer concentration of 0.01 to 3%, i.e., is typical for the activated polymer "solutions" which are conventional for flocculation and viscosification.

One preferred process of the invention comprises utilising the resultant aqueous composition for flocculating a suspension of suspended solids, especially sewage sludge. Preferred processes of this type and suitable polymers for it are described in detail in EP 202,780.

Although it is particularly preferred to treat sewage sludge using the flocculant solution of the invention, the solution can also be used as a retention aid in paper making processes. This is because the invention provides, for the first time, a powder grade of a reverse phase emulsion polymer wherein the powder reverts to primary particles with substantially no risk of permanent agglomeration of the particles into larger gel particles that would interfere with the paper making process.

Another use for the water disintegratable granules or aggregates is as a viscosifier. Thus the granules may be mixed into water and used to viscosity an aqueous composition, wherein the water into which they are mixed may be the water of the aqueous composition or may be water used to form a concentrate which is then added to the composition which is to be viscosified. The amount of cross-linking agent may be relatively low, (for instance 5 to 100 ppm) in which event the polymer may be mainly soluble, or may be relatively high, for instance 300 to 2,000 ppm, in which event the amount of soluble polymer is much lower. For instance cross-linked polymers of ethylenically unsaturated monomers such as acrylic acid and acrylamide are used as print paste thickeners. Normally they are supplied as a reverse phase emulsion and/or dispersion which is added into the print paste but in the invention they can now be supplied as water disintegratable spray-dried granules aggregates.

The following are examples of the invention.

EXAMPLE 1

A aqueous monomer solution is formed of 80% by weight dimethylaminoethylacrylate quaternized with methylchloride and 20% by weight acrylamide. This monomer blend is emulsified into oil using 4% Span 80 (trade mark) calculated on the aqueous phase so as to form an emulsion containing 70% aqueous phase and 30% oil phase. In two experiments of the invention the blend includes 5.0 or 10.0 or 20 ppm methylene-bis-acrylamide. Adipic acid is included in the blend. The oil phase contains the Span 80 together with Exxsol D40 (trade mark). Polymerisation is initiated and allowed to continue in conventional manner.

In each instance, after polymerisation, part of the resultant reverse phase emulsion was analysed shown to have a primary particle-size 90% by weight 0.5 to 3 µm. It was used without further treatment while part was spray dried using a spray drier that gave substantially spherical granules having a narrow size distribution of 90% about 30 µm±5 µm.

The apparent intrinsic viscosity and, the ionic regain were determined and are shown in the following table.

| Type | MBA Level* (ppm) | I. V. (dl/g) | I. R. (%) |
| --- | --- | --- | --- |
| Emulsion | 2.5 | 10.3 | 28 |
| Solid | 2.5 | 10.9 | 24 |
| Emulsion | 5 | 6.4 | 44 |
| Solid | 5 | 7.8 | 37 |
| Emulsion | 10 | 4.0 | 61 |
| Solid | 10 | 4.9 | 57 |

*These amounts are based on the weight of aqueous monomer. The amounts based on dry polymer weight are double, i.e., about 5, 10 and 20 ppm respectively.

The results shown in the table indicate that the spray drying does not cause further cross linking of the cross linked materials, i.e., further reduction in IV and increase in IR. This in itself is somewhat surprising as drying emulsions of cross linkable polymer often does cause further cross linking. Also, performance tests with the emulsions and solids indicated no significant difference between them, thus indicating that there is no loss of performance activity as a result of the spray drying and the aggregation of the primary particles into granules.

EXAMPLE 2

The emulsion polymerization process as described in Example 1 was conducted in the absence of cross linking agent to make a linear, water-soluble, polymer labelled Polymer A, in the form of a reverse phase emulsion of aqueous polymer droplets. This polymer gave IV of 11.0 dl/g and IR of 0%.

The same process was repeated except that cross linking agent was included in the aqueous monomer blend. The polymer in the resultant emulsion had IV 5.2 dl/g and IR 62%.

Part of the emulsion of Polymer B was subjected to spray drying to form spray dried granules, labelled Polymer C. Polymer C had IV 4.9 dl/g and IR 53%.

Treatment solutions of the three polymer types were formed by mixing the emulsions of A or B or the granules of C into water so as to make an aqueous flocculant composition. This flocculant composition was dosed onto thickened sewage sludge and flocculation performance was conducted by a 5 second free drainage test at 15 seconds shear using a Heidolph at different doses of polymer. The 5 second filtrate volume in milliliters at different doses was plotted. The results are shown in the accompanying drawing which shows the dose performance relationship for the linear emulsion polymer (A) for the cross linked emulsion polymer (B) and for the spray dried granules (C).

The difference between the linear and cross linked emulsion Polymers A and B in this test is consistent with the known performance differences of linear and cross linked polymers. The cross linked polymer requires a higher dose but gives much better performance.

It will be seen that the act of spray drying this polymer and converting it to granules slightly depresses optimum dewatering rate (about 350 compared to about 370) but slightly improves dose effectiveness. This improvement in dose effectiveness (without significant loss in optimum performance) is an indication that the characteristic particulate structure of Polymer B (compared to the truly soluble Polymer A) must have been retained in the spray dried granules and in the flocculant solution obtained from them.

We claim:

1. Spray dried granules which have a size at least 90% by weight above 20 µm and which are formed of primary particles, wherein the primary particles have a size at least 90% by weight below 10 µm and are formed of polymer of water soluble ethylenically unsaturated monomer or monomer blend and 5 to 2000 ppm polyethylenically unsaturated cross linking agent and contain water soluble polymer and water insoluble polymer, the granules have been formed by spray drying a reverse phase emulsion of the primary polymer particles in the non-aqueous liquid and the granules disintegrate substantially completely upon addition to water.

2. Granules according to claim 1 in which the polymer has an intrinsic viscosity of at least 4 dl/g.

3. Granules according to claim 1 or claim 2 in which the polymer is a cationic polymer and has ionic regain at least 25%.

4. Granules according to claim 1 which disintegrate substantially completely into particles of below 10 µm upon addition to water.

5. A process of making granules which have a size at least 90% by weight above 20 µm and which are formed of primary particles having a size at least 90% by weight below 10 µm and which contain water soluble polymer and water insoluble polymer, the process comprising making an emulsion of the primary particles in a non-aqueous liquid by reverse phase polymerisation of water soluble ethylenically unsaturated monomer or monomer blend which includes 5 to 2000 ppm polyethylenically unsaturated cross linking agent, and spray drying the emulsion and thereby making spray dried granules which are formed of the primary particles and which disintegrate substantially completely upon addition to water.

6. A process according to claim 5 in which the emulsion made by reverse phase polymerisation is an emulsion of aqueous primary polymer particles in non-aqueous liquid and contains 20 to 70% water and the emulsion which is spray dried also contains 20 to 70% water in the primary polymer particles.

7. A process according to claim 5 or claim 6 in which the emulsion contains 1 to 10%, based on the dry weight of polymer, of additives selected from water-in-oil emulsifier, hydrophilic polymer and amphipathic polymer.

8. A process according to claim 5 in which the polymer has intrinsic viscosity at least 4 dl/g.

9. A process according to claim 5 in which the polymer is a cationic polymer and has ionic regain at least 25%.

10. A process according to claim 5 in which the granules disintegrate substantially completely into particles below 10 µm upon addition to water.

11. A process of making a flocculant solution comprising mixing into water granules according to claim 1 or granules made by a process according to claim 5.

12. A process of flocculating a suspension of suspended solids comprising forming a flocculant solution by a process according to claim 11 and mixing the resultant solution with the suspended solids and then subjecting the resultant flocculated suspension to solid-liquid separation.

13. A process according to claim 12 in which the separation is by a method selected from centrifugation, belt pressing, belt thickening, centrifugal dewatering, centrifugal thickening and filter pressing.

14. A process of viscosifying an aqueous composition comprising blending into the composition, or into water which is subsequently added to the composition, granules according to claim 1 or granules made by a process according to claim 5.

15. A process of making a flocculant solution or viscosified solution comprising mixing into water granules which have a size at least 90% by weight above 20 µm and which have been made by reverse phase emulsion polymerisation in a non-aqueous liquid of water-soluble ethylenically unsaturated monomer or monomer blend which includes 5 to 2,000 ppm polyethylenically unsaturated cross linking agent and thereby forming polymer particles having a size at least 90% by weight below 10 µm and which contain water-soluble polymer and water-insoluble polymer, and spray drying the emulsion to form the granules.

* * * * *